Fig. 1.

INVENTOR
Albert J. Sarka

Fig. 2.

INVENTOR
Albert J. Sarka

July 24, 1962

A. J. SARKA 3,045,519

STRIP CLAMPING AND FRONT STOP MEANS FOR
CYCLICALLY OPERABLE SHEAR

Filed Dec. 8, 1958

INVENTOR
Albert J. Sarka

INVENTOR
Albert J. Sarka

July 24, 1962

A. J. SARKA 3,045,519

STRIP CLAMPING AND FRONT STOP MEANS FOR
CYCLICALLY OPERABLE SHEAR

Filed Dec. 8, 1958

INVENTOR
Albert J. Sarka
Hooper, Leonard & Buell
his attorneys

United States Patent Office 3,045,519
Patented July 24, 1962

3,045,519
STRIP CLAMPING AND FRONT STOP MEANS FOR CYCLICALLY OPERABLE SHEAR
Albert J. Sarka, Maple Heights, Ohio, assignor, by mesne assignments, to The Wean Engineering Company, Inc.
Filed Dec. 8, 1958, Ser. No. 778,722
30 Claims. (Cl. 83—157)

This invention relates to shearing continuously advancing strip. It has to do with improvements in apparatus for shearing continuously advancing strip of the type disclosed in a number of my patent applications including, for example, application Serial No. 617,180, filed October 19, 1956, and application Serial No. 751,434, filed July 28, 1958.

My above mentioned patent applications disclose apparatus for shearing continuously advancing strip comprising a cyclically operable shear which advances while it shears, the shear including continuously cyclically operating shearing means, a front stop connected with the shear and advanceable therewith, means for advancing strip relatively to the shear to register the leading end of the strip to the advancing front stop to position the strip for shearing and means moving the front stop to inoperative position to permit advance of the sheared off portion of the strip. Provision is made for clamping the strip relatively to the shear at the instant of shearing and during that instant rendering inoperative the means for advancing the strip relatively to the shear so that as the material is being sheared it is moving under the control of the shear, contributing to accuracy of shearing.

In my above mentioned applications the front stop is disclosed as being carried by the upper head of the shear and the movable clamping element is also carried by the upper head of the shear, the material being sheared being clamped to the shear only adjacent the front stop. I have found that such an arrangement is not optimum for modern high speed operation in which strip speeds are much greater than they were a few years ago. I find that the front stop should have its inoperative position below the pass line rather than above the pass line, and I provide a novel structure for mounting and operating the front stop which adapts my apparatus for unprecedently high speed operation. I mount the front stop in the lower head of the shear. I also find that the clamping means for clamping the strip to the shear should be carried by the lower head of the shear. Further, I provide for clamping the strip both at a portion of the strip beyond the shearing means and at a portion of the strip approaching but which has not yet reached the shearing means to insure flatness of the sheet during shearing whereby not only higher speed but unprecedented accuracy of cut is provided for.

I provide apparatus for shearing continuously advancing strip comprising a cyclically operable shear which advances while it shears, the shear including continuously cyclically operating shearing means, a front stop connected with the shear and advanceable therewith, the front stop having an operative position in the pass line and an inoperative position below the pass line, means for advancing strip relatively to the shear to register the leading end of the strip to the advancing front stop when the front stop is in operative position in the pass line to position the strip for shearing and means retracting the front stop downwardly to its inoperative position below the pass line to permit advance of the sheared off portion of the strip. Desirably a plurality of front stops should be provided, one being disposed close to one side edge of the strip and another being disposed close to the other side edge of the strip. The front stop or stops should be carried by one of the opposed relatively movable heads of the shear and the other head should carry means retracting the front stop or stops to its or their inoperative position. As above indicated the front stop (the singular will be used for simplicity of expression; it includes the plural) should be carried by the lower head, and the upper head should carry means retracting the front stop downwardly to inoperative position below the pass line. Means should be provided urging the front stop upwardly toward operative position, and the means retracting the front stop downwardly to inoperative position below the pass line should act against the action of the means urging the front stop upwardly toward its operative position.

Preferably means are provided for latching the front stop in inoperative position and means are carried by the head other than the head carrying the front stop for rendering inoperative the latching means to permit the means urging the front stop toward operative position to move the front stop to operative position. Desirably the front stop is carried by the lower head and means are carried by the upper head for rendering inoperative the latching means to permit the means urging the front stop upwardly toward operative position to so move the front stop. Desirably a latching member is mounted on the head carrying the front stop and is movable generally therealong for latching the front stop in inoperative position and means are carried by the other head for moving the latching member along the first mentioned head to render the latching member inoperative and permit the means urging the front stop toward operative position to so move the front stop.

I preferably provide connections between the shear and the front stop constructed and arranged to position the front stop at a selected one of a plurality of spaced apart locations relatively to the shear and also including micrometer means for fine adjustment of the position of the front stop relatively to the shear when the front stop is disposed in any of said locations. I preferably provide a carrier for a front stop connected with the shear and advanceable therewith, the connections between the shear and the carrier being constructed and arranged to position the carrier at a selected one of a plurality of spaced apart locations relatively to the shear, and a front stop carried by the carrier, the apparatus also including micrometer means for fine adjustment of the position of the front stop relatively to the shear.

The clamping means for clamping the strip adjacent the leading end thereof in registered relation to the front stop are preferably mounted separately from the front stop. The clamping means should be carried by one of the heads of the shear and means should be carried by the other head for operating the clamping means. As indicated above, I find that the clamping means should be carried by the lower head of the shear, and desirably there should be clamping means adjacent the respective edges of the strip. Means should be carried by the upper head for operating the clamping means. The means for operating the clamping means may include a cam, preferably generally rectilinearly movable, acting to render the clamping means operative as the heads approach each other in a shearing stroke. The means for operating the clamping means may include toggle means for moving the clamping means between operative and inoperative positions. The toggle means may be operated by means carried by the head other than the head carrying the clamping means. The toggle means may be operated by a generally rectilinearly movable cam actuating the toggle means to render the clamping means operative.

As above indicated it is important to the attainment of unprecedented high speed coupled with optimum accuracy of cut that the strip be clamped to the shear both at a portion of the strip beyond the shearing means and adjacent the leading end of the strip and at a portion of the strip approaching but which has not yet reached the shearing means. The clamping means for clamping the portion of the strip approaching but which has not yet reached the shearing means should be connected and movable with the lower head. The means for operating the clamping means may include a cam operable in timed relation with the advance of the shear effective to render the clamping means operative just prior to the instant of shearing, the cam releasing the clamping means upon continued operation of the cam to restore control of the strip to the means for advancing the strip relatively to the shear.

In a preferred form of apparatus the means for operating the clamping means includes a pivoted dog together with stop means for limiting turning of the dog about its pivot in one direction and a cam oscillatable in timed relation with the advance of the shear adapted when moving in one direction to engage and bodily displace the dog when against the stop and thereby render the clamping means operative just prior to the instant of shearing, the cam upon its return movement in the opposite direction turning the dog about its pivot and having no effect on the clamping means.

Other details, objects and advantages of the invention will become apparent as the following description of a present preferred embodiment thereof proceeds.

In the accompanying drawings I have shown a present preferred embodiment of the invention in which.

Figure 1:
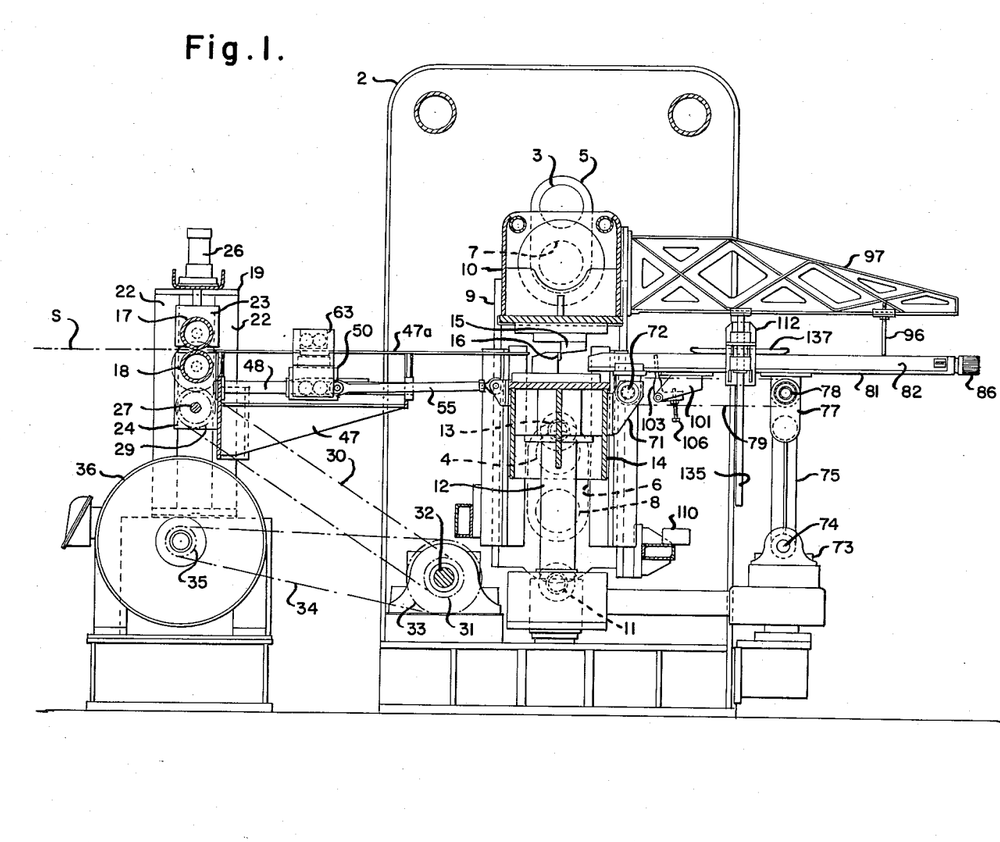
FIGURE 1 is a side elevational view, partly in vertical longitudinal cross section, of apparatus for shearing continuously advancing strip.

Referring now more particularly to the drawings, the shear housing is designated generally by reference numeral 2. The shear which is shown in the drawings is of the type disclosed in Patent No. 2,827,962 and now well known to those skilled in the art. Other flying shears may, however, be employed. In view of that fact and since the present invention does not consist of the shear structure per se but rather has to do primarily with the mounting and operating means for the front stop and the clamping means I have not shown the mechanism of the shear itself in detail. Upper and lower shafts indicated respectively at 3 and 4 rotate in the same direction (counterclockwise viewing FIGURE 1) at the same speed and respectively carry parallel cranks 5 and 6 of equal length. The crank 5 has a crank pin 7 and the crank 6 has a crank pin 8. Carried by the crank pins 7 and 8 for rotary movement in the counterclockwise direction viewing FIGURE 1 is a frame 9 which carries the upper head 10 of the shear.

Journaled in the housing 2 at 11 are a pair of parallel links 12 pivotally connected at 13 to the lower head 14 of the shear. The lower head 14 is guided for up and down movement in the frame 9. Thus as the frame 9 carrying the upper head 10 partakes of its rotary or cyclic movement the lower head 14 oscillates back and forth about the axis 11, the orientation of the lower head being maintained consonant with that of the upper head 10 due to the fact that the lower head moves in guides in the frame 9 which carries the upper head. The upper shearing blade 15 is carried by the upper head 10 and the lower shearing blade 16 is carried by the lower head 14. The operation of the shear itself is evident from the drawings in addition to which it is, as stated above, well known to those skilled in the art. The shearing blades as shown in FIGURE 1 are in the position which they occupy after having just sheared the strip and are about to move away from each other as they move toward the right at the commencement of the succeeding cycle.

The strip being operated on, which may be deemed to be steel strip, is designated S. It moves from left to right viewing FIGURE 1. The strip moves continuously at approximately constant speed. It is fed to the shear by feed rolls 17 and 18 which together with their mounting and driving mechanism are shown in detail in FIGURES 3, 4 and 5. The feed rolls are driven to advance the strip to the shear but during the instant of shearing they are rendered momentarily inoperative so that at that instant the advancing movement of the strip is controlled by the shear in a manner presently to be described and not by the feed rolls.

The feed roll housing is shown at 19. The housing has opposed side frames 20 and 21 each having spaced apart guides 22 forming guideways for upper journal blocks 23 and lower journal blocks 24. The roll 17 is journaled in the upper journal blocks 23 and the roll 18 is journaled in the lower journal blocks 24.

Figure 4:
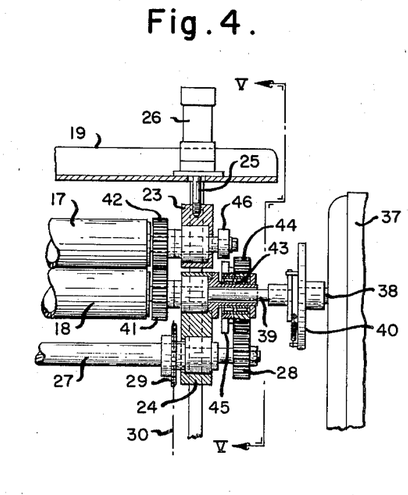
FIGURE 4 is an enlarged fragmentary detail view, partly in vertical transverse cross section, of a portion of the structure shown in FIGURE 3.
Figure 5:
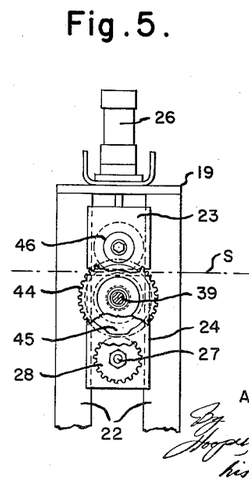
FIGURE 5 is a vertical longitudinal cross sectional view taken on the line V—V of FIGURE 4.

Each of the upper journal blocks 23 has threaded thereinto as shown in FIGURE 4 the lower end of a piston rod 25 the upper end of which is connected with a piston operating in one of a pair of cylinders 26. Fluid under pressure is applied to the upper face of the piston in each of the cylinders 26 so that the roll 17 is pressed down toward the roll 18 while at the same time being capable of being lifted against the fluid pressure in the cylinders 26 by means presently to be described to render the feed rolls 17 and 18 momentarily inoperative for feeding the strip S to the shear.

The lower journal blocks 24 are mounted in fixed position in the guideways by any suitable means, not shown, as well known to those skilled in the art. Provision may be made for vertical adjustment of the journal blocks in the guideways but in the operation of the apparatus they remain in place.

Also journaled in the journal blocks 24 and disposed below the roll 18 is a shaft 27. The ends of the shaft 27 project through the journal blocks 24 and carry gears 28. The shaft 27 has fixed thereto a sprocket 29 about which is trained a sprocket chain 30 which is also trained about a sprocket 31 fixed to a shaft 32 journaled in the frame of the apparatus. Also fixed to the shaft 32 is a sprocket 33. A sprocket chain 34 is trained about the sprocket 33 and also about a sprocket 35 fixed to the shaft of a driving element 36 which may be an electric motor or a reducing gear mechanism driven by an electric motor or other source of power. Thus the driving element 36 through the mechanism described drives the shaft 27 and hence turns the gears 28 carried by the projecting ends of the shaft 27.

The feed rolls 17 and 18 are driven by a P.I.V. or other suitable variable speed drive 37 whose driving shaft 38 is connected with the projecting end of the shaft 39 of the roll 18 through a spring loaded clutch 40. Fixed to the shaft of the roll 18 is a gear 41. Fixed to the shaft of the roll 17 is a gear 42. The gears 41 and 42 are identical and are always in mesh, even when the roll 17 is slightly raised to render the feed rolls momentarily inoperative as above described. Thus the feed rolls are constantly driven at a controlled speed synchronized to the press speed so that the strip is advanced to the press at approximately the forward lineal speed of the shear blades 15 and 16 at the instant of shearing.

Figure 3:
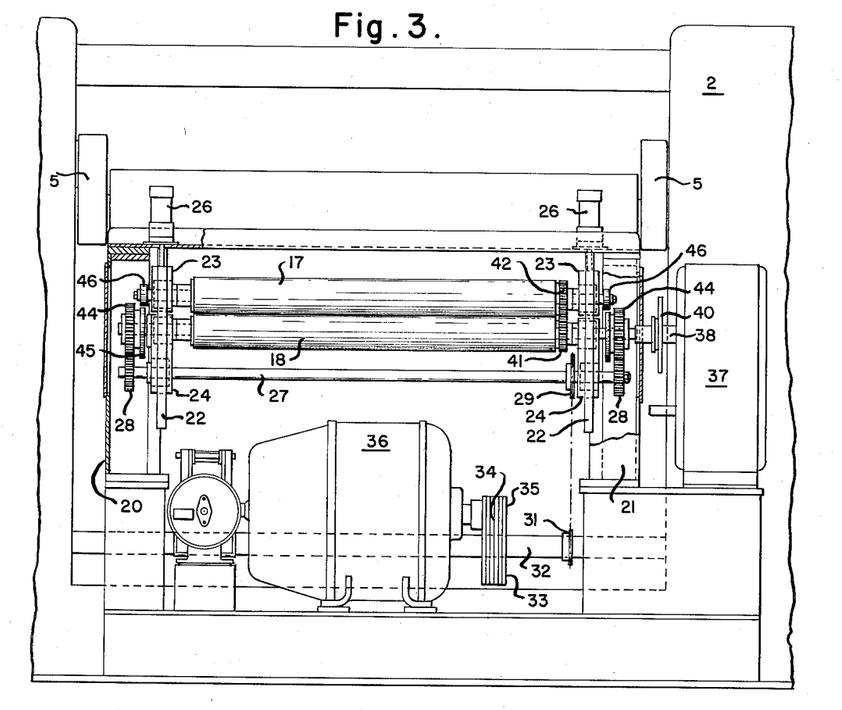
FIGURE 3 is a partial end elevational view of the apparatus shown in FIGURE 1 viewed from the left-hand end of FIGURE 1.

A bearing 43 is mounted about the projecting portion of the shaft of the roll 18 at each end of the roll as shown in FIGURES 3 and 4, and a gear 44 meshing with the corresponding gear 28 is journaled for rotation about each bearing 43. Connected with each gear 44 is a cam 45. Each projecting end of the shaft of the roll 17 carries a cam following roller 46 disposed directly above the corresponding cam 45. The two cams 45 are of course synchronized and upon each revolution of the gears 44 they momentarily act upon the cam following rollers 46 to raise the roll 17 and thus allow the shear, through mechanism now to be described, to control the strip during the instant of shearing.

As above indicated, I clamp the strip in relation to the shear both adjacent the leading end of the strip and at a portion of the strip approaching but which has not yet reached the shearing means whereby to insure flatness of the strip during the cut and optimum accuracy of cutting. The means for clamping the strip at a portion of the strip approaching but which has not yet reached the shearing means will be called the entry clamp and is shown in FIGURES 6 to 10, inclusive. Actually the entry clamp consists of two clamps adjacent the respective edges of the strip, the two clamps being operated in unison.

Figures 7, 8:
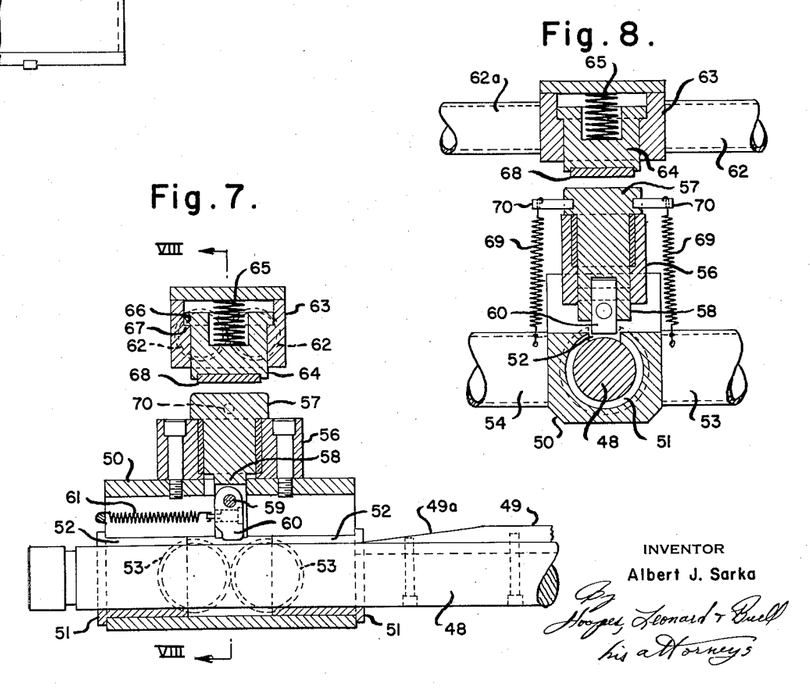
FIGURE 7 is a further enlarged fragmentary vertical longitudinal cross sectional view of a portion of the structure shown in FIGURE 6.
FIGURE 8 is a vertical transverse cross sectional view taken on the line VIII—VIII of FIGURE 7.
Figure 9:
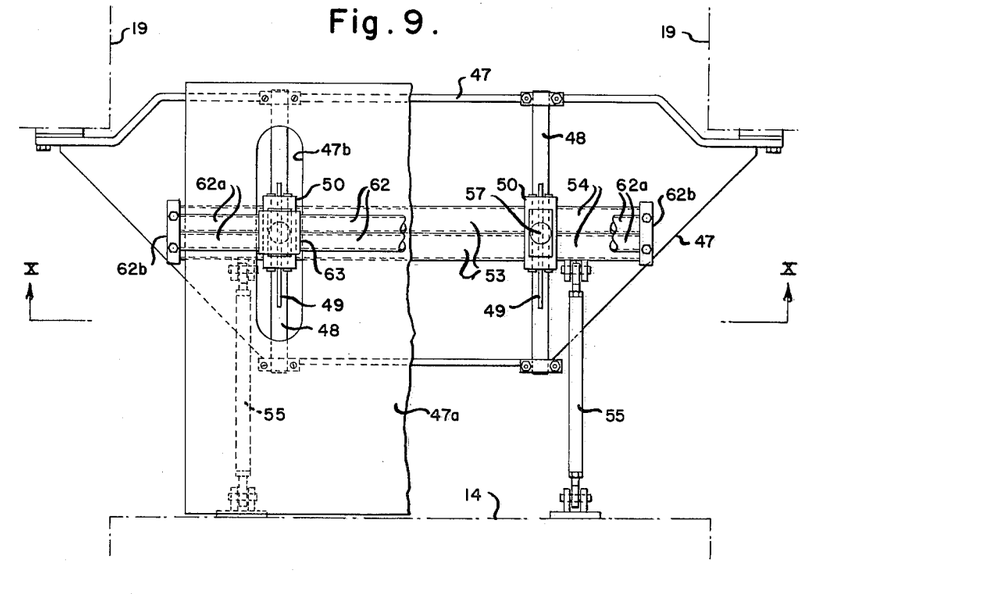
FIGURE 9 is a fragmentary plan view of a portion of the structure shown in FIGURE 1 with a part cut away for clarity of showing.
Figure 10:
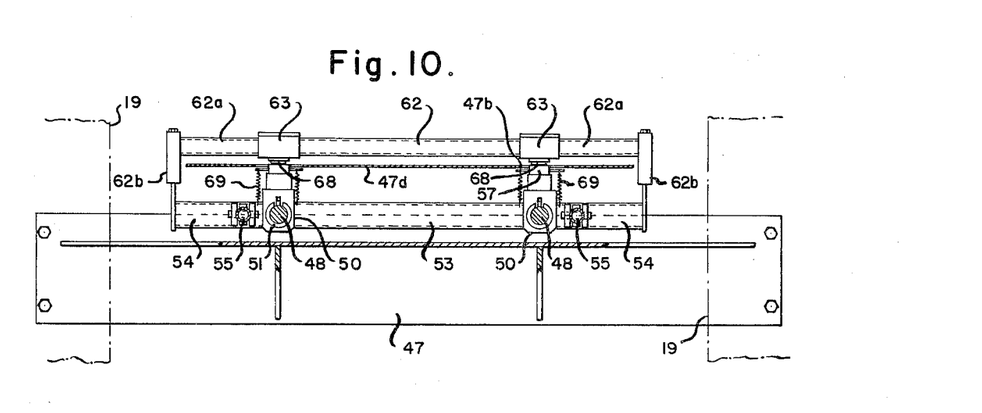
FIGURE 10 is a vertical transverse cross sectional view taken on the line X—X of FIGURE 9.

Carried by the feed roll housing 19 is a supporting bracket 47. The bracket 47 carries a table 47a upon which the strip is advanced to the shear. The bracket 47 also carries below the table 47a two longitudinally oriented supporting and guiding rods 48. Mounted atop each of the rods 48 is a cam 49. The rods 48 are stationary and the entry clamps presently to be described oscillate thereon, being operated by the cams 49. Each of the entry clamps comprises a block 50 having therein bearings 51 receiving the corresponding rod 48 as shown in FIGURE 7. Each bearing has a cutout 52 at the top to provide clearance for the corresponding cam 49. The blocks 50 are connected to each other by cross members 53. Projections 54 project outwardly from the blocks 50. The projections 54 are connected with the lower head 14 of the shear by links 55. Thus during operation of the shear the blocks 50 are oscillated back and forth over the rods 48 just below the table 47a and the pass line. Although the lower head 14 moves in a slightly arcuate path the blocks 50 move in straight lines parallel to the pass line of the strip.

Mounted atop each block 50 is a cylindrical mounting member 56 in which is mounted for vertical movement a lower clamping element 57 having a stem 58 projecting downwardly into the block. The lower clamping elements 57 are disposed and move back and forth, as will presently be described, in slots or openings 47b in the table 47a. Pivoted to each stem 58 at 59 is a dog 60 which, viewing FIGURE 7, is held by a spring 61 in a substantially vertical position, the dog being prevented by a stop (not shown) from turning in the clockwise direction from the position shown in FIGURE 7. Each dog 60 can turn in the counterclockwise direction against the action of the spring 61.

The mounting structure for the entry clamps also includes cross members 62 carrying two blocks 63, one above each block 50. Projections 62a project outwardly from the blocks 63. The cross members 62, blocks 63 and projections 62a are supported above the table 47a by the projections 54 through connecting members 62b. An upper clamping element 64 is mounted in each block 63, being urged downwardly by a spring 65. The downward movement of each of the upper clamping elements 64 is limited by engagement of a projection 66 of the clamping element against a shoulder 67 of the block 63. Each clamping element 64 is faced with a suitable clamping pad 68. Each lower clamping element 57 is urged downwardly by springs 69 connected therewith through projecting pins 70 and also connected with the one of the cross members 53 and one of the projections 54.

Figure 6:
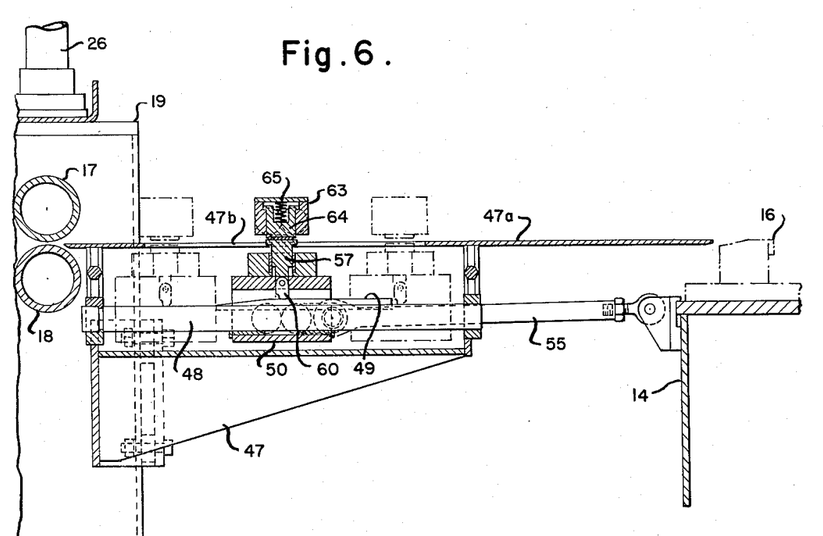
FIGURE 6 is an enlarged fragmentary vertical longitudinal cross sectional view of a portion of the structure shown in FIGURE 1.

As the head 14 moves toward the right viewing FIGURE 1 and also viewing FIGURES 6 and 7 the blocks 50 move with the head since they are connected to the head by the links 55, the rods 48 carrying the cams 49 remaining stationary. The cams 49 are engaged by the dogs 60 which ride up the inclined end portions 49a of the cams, raising the lower clamping elements 57 and clamping the strip to the upper clamping elements 64. The strip is thus clamped only momentarily. As soon as the ends of the cams 49 pass the dogs 60 as the blocks 50 move toward the right, viewing FIGURE 6, the lower clamping elements 57 are moved downwardly by the springs 69 and the clamps are released. Upon the return movement of the blocks 50 to the left the cams 49 turn the dogs 60 in the counterclockwise direction viewing FIGURE 7 about their pivots 59 so that during the return movement of the clamping means the strip is not clamped. When the dogs ride down the inclined portions 49a of the cams 49 to the position shown in FIGURE 7 they are returned to their normal or upright position as shown in that figure ready for the succeeding cycle.

Figure 2:
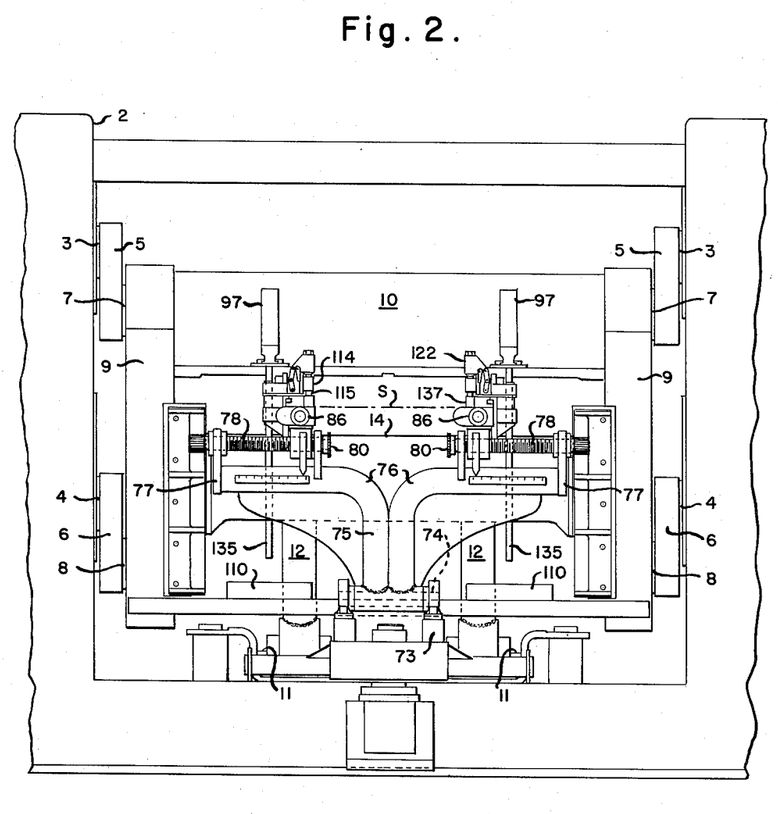
FIGURE 2 is a partial end elevational view of the apparatus shown in FIGURE 1 viewed from the right-hand end of FIGURE 1.

The lower head 14 carries a pair of brackets 71 through each of which is threaded a transverse adjusting screw 72. The machine base carries a bracket 73 to which is pivoted at 74 a lever 75 the upper end of which is bifurcated as shown at 76 (see FIGURE 2) and carries at opposite sides brackets 77 through which transverse adjusting screws 78 are threaded. The screw 72 and the screw 78 at each side of the apparatus are connected by a sprocket chain 79 trained about sprockets 80 fixed to the screws so that turning of either the screw 72 or the screw 78 at one side of the apparatus causes turning of both screws at that side. Carried by the screws 72 and 78 at each side of the apparatus is a bar 81. By adjustment of the screws the bars 81 may be moved toward and from the center line of the apparatus to adjust for strip of different widths.

Connected with each bar 81 are retainers 82, and a slide 83 is longitudinally slidable upon each bar 81 and is retained atop the bar by the retainers 82. Each slide 83 is adjustable longitudinally of the bar 81 on which it is mounted by a micrometer screw 84 pinned to the bar by a pin 85 and threading into a thimble 86 carrying a nut which cooperates with the micrometer screw as well known to those skilled in the art.

Connected with each bar 83 by screws 83a extending through spacers 83b disposed in openings 83c in one of the corresponding retainers 82 is a lateral extension 83d.

Connected to each lateral extension 83d by screws 83e passing through bores 87 therein is a mounting member 88. The position of the mounting member 88 longitudinally of the slide 83 may be adjusted by applying the screws in selected bores 87. In that way a "rough" adjustment of the position of the mounting member 88 longitudinally of the slide 83 is obtained, and a fine adjustment of the longitudinal position of the mounting member relatively to the bar 81 is obtained by the micrometer mechanism above described.

Pivoted to each mounting member 88 at 89 is a front stop member 90 having a shoulder 91 constituting a front stop for properly positioning or registering the leading end of the strip for a shearing stroke of the apparatus. Each front stop member 90 is urged upwardly to operative position in the pass line by a spring 92 and is adapted to be depressed downwardly to a position below the pass line against the action of the spring 92 by means presently to be described. A latch 93 is provided to maintain the stop member in inoperative position against the action of the spring 92. When the stop member is in inoperative position with the spring 92 compressed the left-hand end 94 of the stop member is spaced from the mounting member 88 sufficiently to allow the extremity 95 of the latch member 93 to underlie the same, thereby maintaining the stop member in inoperative position. When the latch member 93 is withdrawn to the left viewing FIGURE 14 the latch member 90 is allowed to turn through a small angle in the counterclockwise direction about the axis of the pivot 89 under the action of the spring 92 and thereby move to operative position in the pass line.

Each stop member 90 is adapted to be depressed to inoperative position below the pass line by a downwardly extending detent or pin 96 carried by an arm 97 connected with the upper head 10. The pins 96 engage the respective stop members 90 at points 98 (see FIGURE 12) outwardly of the edges of the strip.

Figures 11, 12, 13, 14:
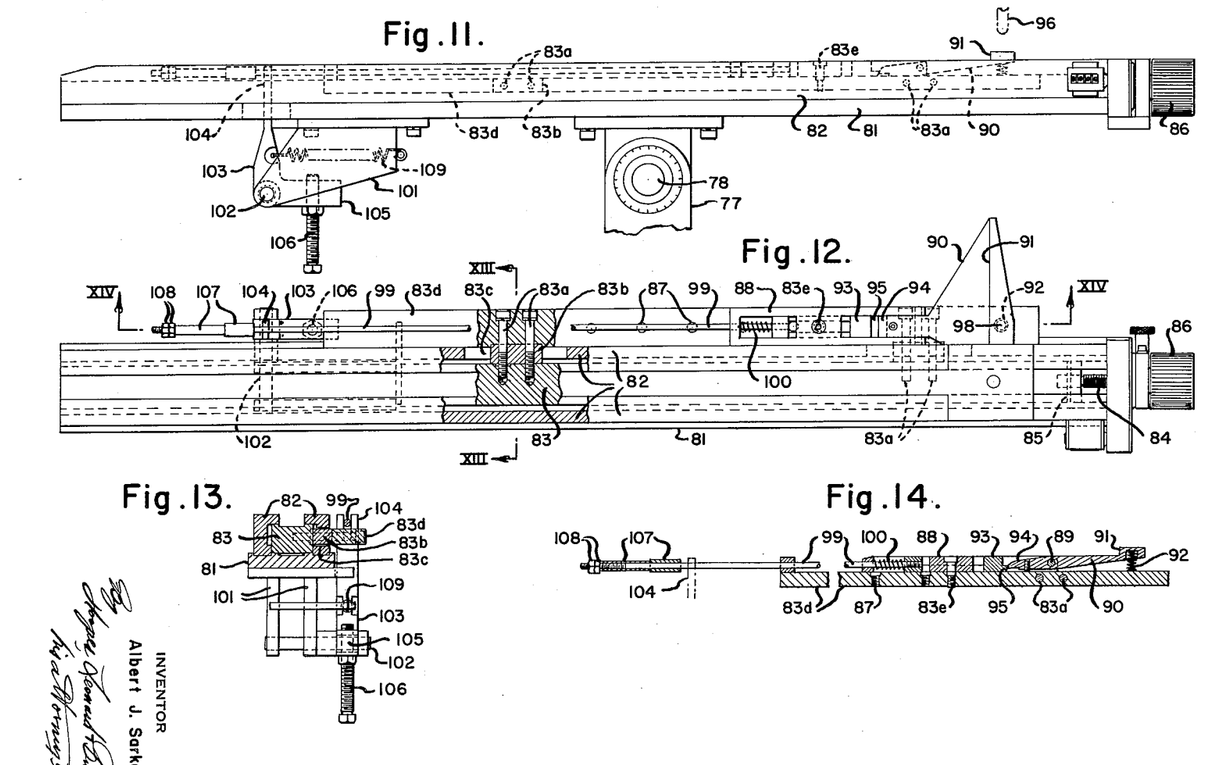
FIGURE 11 is a detail side elevational view of the front stop and the mounting and adjusting means therefor.
FIGURE 12 is a top plan view of the structure shown in FIGURE 11 but partly in horizontal cross section.
FIGURE 13 is a vertical transverse cross sectional view taken on the line XIII—XIII of FIGURE 12.
FIGURE 14 is a fragmentary vertical longitudinal cross sectional view taken on the line XIV—XIV of FIGURE 12.
Figure 15:
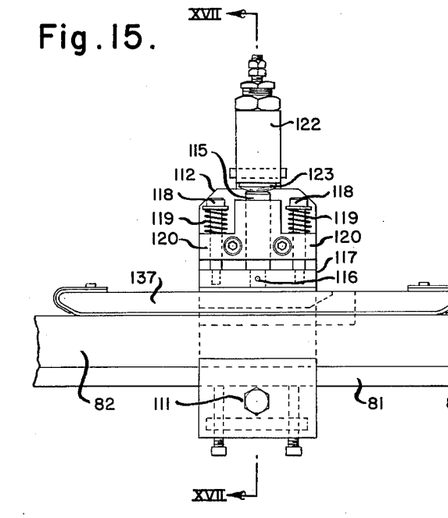
FIGURE 15 is an enlarged detail view of another portion of the apparatus shown in FIGURE 1.
Figure 16:
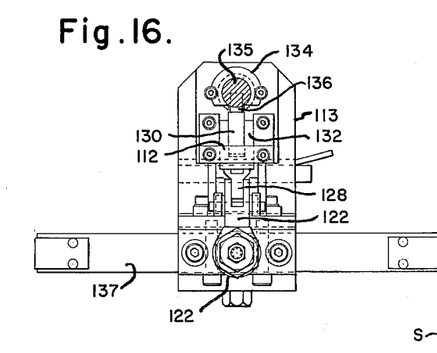
FIGURE 16 is a top plan view of the structure shown in FIGURE 15.

A rod 99 is connected with each latch 93 and extends to the left therefrom viewing FIGURES 12 and 14. A spring 100 urges each latch member 93 and its attached rod 99 toward the right viewing FIGURES 12 and 14. Each bar 81 carries a bracket 101 to which is pivoted at 102 a bell crank lever 103 having a generally vertically extending bifurcated arm 104 and a generally horizontally extending arm 105 into which a screw 106 is threaded from below and adapted to be adjustably positioned. Each rod 99 passes between the bifurcations of the arm 104 of the corresponding bell crank lever 103 and spacing collars 107 are applied to the left-hand end of the rod 99 viewing FIGURE 12 and maintained in place on the rod by nuts 108. The right-hand spacing collar 107, viewing FIGURE 12, on each rod 99 lies against the corresponding arm 104. Each bell crank lever 103 is biased to turn in the clockwise direction about the axis of its pivot 102 by a spring 109.

With the front stop members 90 in their upper operative positions in the pass line the leading end of the strip is registered against the stop shoulders 91 whereupon the strip is clamped by the entry clamps above described and the additional clamps presently to be described, and as the upper head 97 moves downwardly the pins 96 depress the clamping members 90, moving them down to inoperative position below the pass line and permitting the sheared off portion of the strip to be delivered toward the right viewing FIGURE 1. Suitable conveying apparatus as well known to those skilled in the art will be provided for conveying away the sheared off portions of the strip. Upon depressing of the front stop members 90 the latches 93 are moved toward the right by the springs 100 to underlie the left-hand extremities 94 of the front stop members 90 and thus maintain the front stop members inoperative for a portion of a cycle. As the upper head 10 moves upwardly detents 110 carried thereby engage the heads of the screws 106 and turn the bell crank levers 103 in the counterclockwise direction about the axes of their pivotal mountings 102 causing the bifurcated arms 104 acting against the sleeves 107 to move the rods 99 to the left viewing FIGURE 12 to release the front stop members 90 which thereupon are moved up to operative position in the pass line by the springs 92.

Clamped to each bar 81 by clamping mechanism 111 is a bracket 112 having an extension 113 carrying a hollow cylindrical bearing 114 in which is mounted for vertical movement a plunger 115. The bottom of each plunger 115 is connected by a pin at 116 with a bar 117 which carries an upper clamping member 137. Also connected with each bar 117 and extending upwardly therefrom are headed pins 118, and a spring 119 surrounds each pin 118 below the head thereof and bears upon a portion 120 of the bracket whereby the corresponding plunger 115 and hence the clamping member 137 carried thereby is biased to move upwardly. Upward movement of each plunger is limited by engagement of the corresponding bar 117 with the corresponding bracket portion 120.

Figure 17:
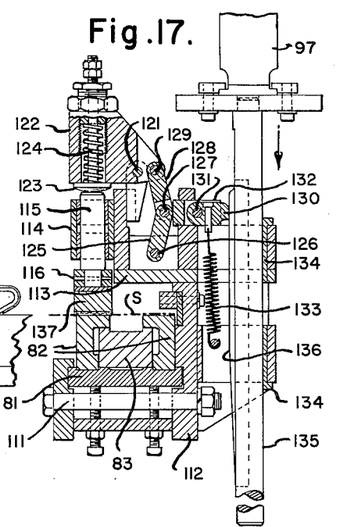
FIGURE 17 is a vertical transverse cross sectional view taken on the line XVII—XVII of FIGURE 15.
Figure 18:
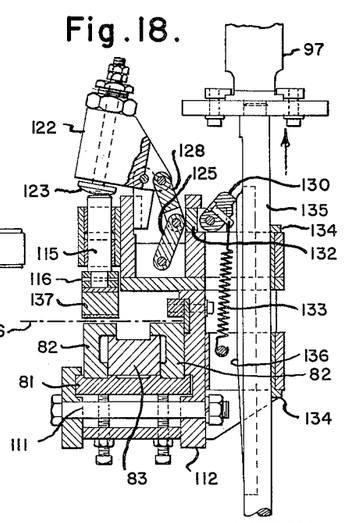
FIGURE 18 is a view similar to FIGURE 17 but showing the parts in a different operative position.

Pivoted to each bracket at 121 is a carrier 122 carrying an operating member 123 for operating the corresponding plunger 115 and clamping member 137. Each operating member 123 is urged downwardly by a spring 124 and is positioned directly above the corresponding plunger 115. A link 125 is pivoted to each bracket at 126 and each link 125 is also pivoted at 127 to another link 128 pivoted to the corresponding carrier 122 at 129. Each pair of links 125 and 128 constitute a toggle operating mechanism for the corresponding carrier 122. When the toggle tends to straighten out as shown in FIGURE 17 the carrier 122 is turned in the counterclockwise direction about the axis of the pivot 121 and when the links of the toggle tend to fold up as shown in FIGURE 18 the carrier turns in the clockwise direction about the axis of the pivot 121. Each toggle is operated by a dog 130 pivoted at 131 to a slide 132 operating against the center of the toggle and adapted to press toward the left to tend to straighten out the toggle as illustrated by comparison between FIGURES 17 and 18. Each dog 130 operates in the same manner as the above described dogs 60. Each dog 130 can turn only in the counterclockwise direction viewing FIGURES 17 and and 18 and is at all times biased toward the position of FIGURE 17 by a spring 133. Each bracket 112 has bearings 134 similar and analogous in function to the bearings 51 above described, and a rod 135 analogous in structure and function to the rods 48 operates in the bearings 134 of each bracket 112 in relation to the corresponding dog 130, each rod carrying a cam 136 analogous in structure and function to the cams 49. Each rod 135 is connected with the arm 97 and as the upper head 10 moves downwardly the cams 136 operate against the dogs 130 to move the clamping members 137 to operative or clamping position as shown in FIGURE 17. After each cam 136 has passed the corresponding dog 130 the toggle is relieved and the clamping mechanism moves to the position shown in FIGURE 18, unclamping the strip. Upon upward movement of the upper head 10 the cams 136 turn the dogs 130 in the counterclockwise direction viewing FIGURES 17 and 18 about the axes of the pivots 131 without affecting the clamping mechanism. Each upper clamping member 137 acts against the suitably faced upper surface of the corresponding retainer 82 serving as the cooperating lower clamping member.

The sequence of operations of my apparatus is as follows. As the upper head begins to move downwardly on an operative stroke of the apparatus the front stop members 90 are up in operative position in the pass line and the feed rolls 17 and 18 are feeding the strip forward. Both the entry clamps and the front clamps are in inoperative position. As the forward end of the strip registers to the stop shoulders 91 of the front stops the entry and front clamps are rendered operative. The feed rolls are rendered inoperative and the front stops 90 are moved down to inoperative position out of the pass line. During the actual shearing operation the entry and front clamps clamp the strip in relation to the lower head so that the strip during shearing moves precisely with the lower head and is controlled thereby. As soon as the strip has been sheared the clamps are rendered inoperative and the feed rolls are rendered operative. The provision of the front stop members carried by the lower head and movable to inoperative position below the pass line and the entry clamps and front clamps carried by the lower head insures flatness of the strip during shearing and optimum accuracy of cut at modern high speeds.

While I have shown and described a present preferred embodiment of the invention it is to be distinctly understood that the invention is not limited thereto but may be otherwise variously embodied within the scope of the following claims.

I claim:

1. Apparatus for shearing continuously advancing strip comprising a cyclically operable shear which advances while it shears, the shear including continuously cyclically operating shearing means, a front stop connected with the shear and advanceable therewith, means mounting the front stop for movement between an operative position in the pass line and an inoperative position below the pass line, means for advancing strip relatively to the shear to register the leading end of the strip to the advancing front stop when the front stop is in operative position in the pass line to position the strip for shearing and means retracting the front stop downwardly to its inoperative position below the pass line to permit advance of the sheared off portion of the strip.

2. Apparatus for shearing continuously advancing strip comprising a cyclically operable shear which advances while it shears, the shear including continuously cyclically operating shearing means, front stops connected with the shear and advanceable therewith, one front stop being disposed close to one side edge of the strip and another front stop being disposed close to the other side edge of the strip, means mounting the front stops for movement between an operative position in the pass line and an inoperative position below the pass line, means for advancing strip relatively to the shear to register the leading end of the strip to the advancing front stops when the front stops are in operative position in the pass line to position the strip for shearing and means retracting the front stops downwardly to their inoperative position below the pass line to permit advance of the sheared off portion of the strip.

3. Apparatus for shearing continuously advancing strip comprising a cyclically operable shear which advances while it shears, the shear including continuously cyclically operating shearing means, the shear having opposed relatively movable heads, a front stop carried by one of the heads, means mounting the front stop for movement between an operative position in the pass line and an inoperative position offset from the pass line, means for advancing strip relatively to the shear to register the leading end of the strip to the advancing front stop when the front stop is in operative position in the pass line to position the strip for shearing and means carried by the other head retracting the front stop to its inoperative position offset from the pass line to permit advance of the sheared off portion of the strip.

4. Apparatus for shearing continuously advancing strip comprising a cyclically operable shear which advances while it shears, the shear including continuously cyclically operating shearing means, the shear having opposed upper and lower relatively movable heads, a front stop carried by the lower head, means mounting the front stop for movement between an operative position in the pass line and an inoperative position below the pass line, means for advancing the strip relatively to the shear to register the leading end of the strip to the advancing front stop when the front stop is in operative position in the pass line to position the strip for shearing and means carried by the upper head retracting the front stop downwardly to its inoperative position below the pass line to permit advance of the sheared off portion of the strip.

5. Apparatus for shearing continuously advancing strip comprising a cyclically operable shear which advances while it shears, the shear including continuously cyclically operating shearing means, the shear having opposed upper and lower relatively movable heads, front stops carried by the lower head, one front stop being disposed close to one side edge of the strip and another front stop being disposed close to the other side edge of the strip, means mounting the front stops for movement between an operative position in the pass line and an inoperative position below the pass line, means for advancing strip relatively to the shear to register the leading end of the strip to the advancing front stops when the front stops are in operative position in the pass line to position the strip for shearing and means carried by the upper head retracting the front stops downwardly to their inoperative position below the pass line to permit advance of the sheared off portion of the strip.

6. Apparatus for shearing continuously advancing strip comprising a cyclically operable shear which advances while it shears, the shear including continuously cyclically operating shearing means, a front stop connected with the shear and advanceable therewith, the front stop having an operative position in the pass line and an inoperative position below the pass line, means urging the front stop upwardly toward operative position, means for advancing strip relatively to the shear to register the leading end of the strip to the advancing front stop when the front stop is in operative position in the pass line to position the strip for shearing and means retracting the front stop downwardly to its inoperative position below the pass line against the action of said means urging the front stop upwardly toward operative position to permit advance of the sheared off portion of the strip.

7. Apparatus for shearing continuously advancing strip comprising a cyclically operable shear which advances while it shears, the shear including continuously cyclically operating shearing means, the shear having opposed upper and lower relatively movable heads, a front stop carried by the lower head and having an operative position in the pass line and an inoperative position below the pass line, means urging the front stop upwardly toward operative position, means for advancing strip relatively to the shear to register the leading end of the strip to the advancing front stop when the front stop is in operative position in the pass line to position the strip for shearing and means carried by the upper head retracting the front stop downwardly to its inoperative position below the pass line against the action of said means urging the front stop upwardly toward operative position to permit advance of the sheared off portion of the strip.

8. Apparatus for shearing continuously advancing strip comprising a cyclically operable shear which advances while it shears, the shear including continuously cyclically operating shearing means, the shear having opposed relatively movable heads, a front stop carried by one of the heads and having an operative position in the pass line and an inoperative position offset from the pass line, means urging the front stop toward operative position, means for advancing strip relatively to the shear to register the leading end of the strip to the advancing front stop when the front stop is in operative position in the pass line to position the strip for shearing, means carried by the other head retracting the front stop to its inoperative position offset from the pass line against the action of said means urging the front stop toward operative position to permit advance of the sheared off portion of the strip, means for latching the front stop in inoperative position and means also carried by the second mentioned head for rendering inoperative the latching means to permit the means urging the front stop toward operative position to move the front stop to operative position.

9. Apparatus for shearing continuously advancing strip comprising a cyclically operable shear which advances while it shears, the shear including continuously cyclically operating shearing means, the shear having opposed upper and lower relatively movable heads, a front stop carried by the lower head and having an operative position in the pass line and an inoperative position below the pass line, means urging the front stop upwardly toward operative position, means for advancing strip relatively to the shear to register the leading end of the strip to the advancing front stop when the front stop is in operative position in the pass line to position the strip for shearing, means carried by the upper head retracting the front stop downwardly to its inoperative position below the pass line against the action of said means urging the front stop upwardly toward operative position to permit advance of the sheared off portion of the strip, means for latching the front stop in inoperative position and means also carried by the upper head for rendering inoperative the latching means to permit the means urging the front stop upwardly toward operative position to move the front stop upwardly to operative position.

10. Apparatus for shearing continuously advancing strip comprising a cyclically operable shear which advances while it shears, the shear including continuously cyclically operating shearing means, the shear having opposed relatively movable heads, a front stop carried by one of the heads and having an operative position in the pass line and an inoperative position offset from the pass line, means urging the front stop toward operative position, means for advancing strip relatively to the shear to register the leading end of the strip to the advancing front stop when the front stop is in operative position in the pass line to position the strip for shearing, means carried by the other head retracting the front stop to its inoperative position offset from the pass line against the action of said means urging the front stop toward operative position to permit advance of the sheared off portion of the strip, a latching member mounted on the first mentioned head and movable generally therealong for latching the front stop in inoperative position and means carried by the second mentioned head for moving the latching member along the first mentioned head to render the latching member inoperative and permit the means urging the front stop toward operative position to move the front stop to operative position.

11. Apparatus for shearing continuously advancing strip comprising a cyclically operable shear which advances while it shears, the shear including continuously cyclically operating shearing means, a front stop connected with the shear and advanceable therewith, the connections between the shear and the front stop being constructed and arranged to position the front stop at a selected one of a plurality of spaced apart locations relatively to the shear and also including micrometer means for fine adjustment of the position of the front stop relatively to the shear when the front stop is disposed in any of said locations, guide means for the front stop maintaining it in fixed orientation in all of said locations and means for advancing strip relatively to the shear to register the leading end of the strip to the advancing front stop.

12. Apparatus for shearing continuously advancing strip comprising a cyclically operable shear which advances while it shears, the shear including continuously cyclically operating shearing means, a carrier for a front stop connected with the shear and advanceable therewith, the connections between the shear and the carrier being constructed and arranged to position the carrier at a selected one of a plurality of spaced apart locations relatively to the shear, a front stop carried by the carrier, the apparatus also including micrometer means for the fine adjustment of the position of the front stop relatively to the shear, guide means for the carrier maintaining it in fixed orientation in all of said locations and means for advancing strip relatively to the shear to register the leading end of the strip to the advancing front stop.

13. Apparatus for shearing continuously advancing strip comprising a cyclically operable shear which advances while it shears, the shear including continuously cyclically operating shearing means, a front stop connected with the shear and advanceable therewith, means for advancing strip relatively to the shear to register the leading end of the strip to the advancing front stop, clamping means mounted separately from the front stop for clamping the strip adjacent the leading end thereof in registered relation to the front stop and means for selectively positioning the front stop at a plurality of locations relatively to the clamping means in the direction of advance of the strip.

14. Apparatus for shearing continuously advancing strip comprising a cyclically operable shear which advances while it shears, the shear including continuously cyclically operating shearing means, the shear having opposed upper and lower relatively movable heads, a front stop connected with the shear and advanceable therewith, means for advancing strip relatively to the shear to register the leading end of the strip to the advancing front stop, clamping means carried by the lower head for clamping the strip adjacent the leading end thereof in registered relation to the front stop and means for selectively positioning the front stop at a plurality of locations relatively to the clamping means in the direction of advance of the strip.

15. Apparatus for shearing continuously advancing strip comprising a cyclically operable shear which advances while it shears, the shear including continuously cyclically operating shearing means, the shear having opposed upper and lower relatively movable heads, a front stop connected with the shear and advanceable therewith, means for advancing strip relatively to the shear to register the leading end of the strip to the advancing front stop, clamping means carried by the lower head adjacent the respective edges of the strip for clamping the strip adjacent the leading end thereof in registered relation to the front stop and means for selectively positioning the front stop at a plurality of locations relatively to the clamping means in the direction of advance of the strip.

16. Apparatus for shearing continuously advancing strip comprising a cyclically operable shear which advances while it shears, the shear including continuously cyclically operating shearing means, the shear having opposed upper and lower relatively movable heads, a front stop connected with the shear and advanceable therewith, means for advancing strip relatively to the shear to register the leading end of the strip to the advancing front stop, clamping means carried by the lower head for clamping the strip adjacent the leading end thereof in registered relation to the front stop and means carried by the upper head for operating the clamping means.

17. Apparatus for shearing continuously advancing strip comprising a cyclically operable shear which advances while it shears, the shear including continuously cyclically operating shearing means, the shear having opposed upper and lower relatively movable heads, a front stop connected with the shear and advanceable therewith, means for advancing strip relatively to the shear to register the leading end of the strip to the advancing front stop, clamping means carried by the lower head for clamping the strip adjacent the leading end thereof in registered relation to the front stop and means carried by the upper head for operating the clamping means, said last mentioned means including a generally vertically movable cam acting to render the clamping means operative as the heads approach each other in a shearing stroke.

18. Apparatus for shearing continuously advancing strip comprising a cyclically operable shear which advances while it shears, the shear including continuously cyclically operating shearing means, the shear having opposed relatively movable heads, a front stop connected with the shear and advanceable therewith, means for advancing strip relatively to the shear to register the leading end of the strip to the advancing front stop, clamping means carried by one of the heads for clamping the strip adjacent the leading end thereof in registered relation to the front stop and means carried by the other head for operating the clamping means.

19. Apparatus for shearing continuously advancing strip comprising a cyclically operable shear which advances while it shears, the shear including continuously cyclically operating shearing means, the shear having opposed relatively movable heads, a front stop connected with the shear and advanceable therewith, means for advancing strip relatively to the shear to register the leading end of the strip to the advancing front stop, clamping means carried by one of the heads for clamping the strip adjacent the leading end thereof in registered relation to the front stop, means including toggle means for moving the clamping means between operative and inoperative positions and means carried by the other head for operating the toggle means and hence operating the clamping means.

20. Apparatus for shearing continuously advancing strip comprising a cyclically operable shear which advances while it shears, the shear including continuously cyclically operating shearing means, the shear having opposed relatively movable heads, a front stop connected with the shear and advanceable therewith, means for advancing strip relatively to the shear to register the leading end of the strip to the advancing front stop, clamping means carried by one of the heads for clamping the strip adjacent the leading end thereof in registered relation to the front stop, means including toggle means for moving the clamping means between operative and inoperative positions and means carried by the other head for operating the toggle means and hence operating the clamping means, said last mentioned means including a generally vertically movable cam acting to render the clamping means operative as the heads approach each other in a shearing stroke.

21. Apparatus for shearing continuously advancing strip comprising a cyclically operable shear which advances while it shears, the shear including continuously cyclically operating shearing means, a front stop connected with the shear and advanceable therewith, means for advancing strip relatively to the shear to register the leading end of the strip to the advancing front stop and clamping means movable with the shear clamping both a portion of the strip beyond the shearing means and adjacent the leading end of the strip and a portion of the strip approaching but which has not yet reached the shearing means when the leading end of the strip is registered to the front stop.

22. Apparatus for shearing continuously advancing strip comprising a cyclically operable shear which advances while it shears, the shear including continuously cyclically operating shearing means, the shear having opposed upper and lower relatively movable heads, a front stop connected with the shear and advanceable therewith, means for advancing strip relatively to the shear to register the leading end of the strip to the advancing front stop and clamping means connected and movable with the lower head clamping both a portion of the strip beyond the shearing means and adjacent the leading end of the strip and a portion of the strip approaching but which has not yet reached the shearing means when the leading end of the strip is registered to the front stop.

23. Apparatus for shearing continuously advancing strip comprising a cyclically operable shear which advances while it shears, the shear including continuously cyclically operating shearing means, the shear having opposed upper and lower relatively movable heads, a front stop carried by the lower head, means for advancing strip relatively to the shear to register the leading end of the strip to the advancing front stop and clamping means connected and movable with the lower head clamping both a portion of the strip beyond the shearing means and adjacent the leading end of the strip and a portion of the strip approaching but which has not yet reached the shearing means when the leading end of the strip is registered to the front stop.

24. Apparatus for shearing continuously advancing strip comprising a cyclically operable shear which advances while it shears, the shear including continuously cyclically operating shearing means, a front stop connected with the shear and advanceable therewith, means for advancing strip relatively to the shear to register the leading end of the strip to the advancing front stop, clamping means movable with the shear clamping both a portion of the strip beyond the shearing means and adjacent the leading end of the strip and a portion of the strip approaching but which has not yet reached the shearing means when the leading end of the strip is registered to the front stop and means for momentarily rendering inoperative the means for advancing the strip when the clamping means clamp the strip, whereby at the time of shearing the strip is clamped by the clamping means at both sides of the shearing means, insuring advance of the strip at the speed of the shear and also insuring maintaining the strip flat during the shearing operation.

25. Apparatus for shearing continuously advancing strip comprising a cyclically operable shear which advances while it shears, the shear including continuously cyclically operating shearing means, the shear having opposed upper and lower relatively movable heads, a front stop carried by the lower head, means for advancing strip relatively to the shear to register the leading end of the strip to the advancing front stop, clamping means connected and movable with the lower head clamping both a portion of the strip beyond the shearing means and adjacent the leading end of the strip and a portion of the strip approaching but which has not yet reached the shearing means when the leading end of the strip is registered to the front stop and means for momentarily rendering inoperative the means for advancing the strip when the clamping means clamp the strip, whereby at the time of shearing the strip is clamped by the clamping means at both sides of the shearing means, insuring advance of the strip at the speed of the shear and also insuring maintaining the strip flat during the shearing operation.

26. Apparatus for shearing continuously advancing strip comprising a cyclically operable shear which advances while it shears, the shear including continuously cyclically operating shearing means, a front stop connected with the shear and advanceable therewith, the front stop having an operative position in the pass line and an inoperative position below the pass line, means for advancing strip relatively to the shear to register the leading end of the strip to the advancing front stop when the front stop is in operative position in the pass line to position the strip for shearing, means retracting the front stop downwardly to its inoperative position below the pass line to permit advance of the sheared off portion of the strip and clamping means movable with the shear clamping both a portion of the strip beyond the shearing means and adjacent the leading end of the strip and a portion of the strip approaching but which has not yet reached the shearing means when the leading end of the strip is registered to the front stop.

27. Apparatus for shearing continuously advancing strip comprising a cyclically operable shear which advances while it shears, the shear including continuously cyclically operating shearing means, front stops connected with the shear and advanceable therewith, one front stop being disposed close to one side edge of the strip and another front stop being disposed close to the other side edge of the strip, the front stops having an operative position in the pass line and an inoperative position below the pass line, means for advancing strip relatively to the shear to register the leading end of the strip to the advancing front stops when the front stops are in operative position in the pass line to position the strip for shearing, means retracting the front stops downwardly to their inoperative position below the pass line to permit advance of the sheared off portion of the strip and clamping means movable with the shear clamping both a portion of the strip beyond the shearing means and adjacent the leading end of the strip and a portion of the strip approaching but which has not yet reached the shearing means when the leading end of the strip is registered to the front stops.

28. Apparatus for shearing continuously advancing strip comprising a cyclically operable shear which advances while it shears, the shear including continuously cyclically operating shearing means, means for advancing strip relatively to the shear, clamping means advanceable with the shear clamping a portion of the strip while the strip is being sheared, means for momentarily rendering inoperative the means for advancing the strip when the clamping means clamp the strip, whereby at the time of shearing the advance of the strip is controlled by the shear, and means for operating the clamping means including an operating member operable in timed relation with the advance of the shear effective to render the clamping means operative just prior to the instant of shearing, the operating member releasing the clamping means upon continued operation of the operating member to restore control of the strip to the means for advancing the strip relatively to the shear.

29. Apparatus for shearing continuously advancing strip comprising a cylically operable shear which advances while it shears, the shear including continuously cyclically operating shearing means, means for advancing strip relatively to the shear, clamping means advanceable with the shear clamping a portion of the strip while the strip is being sheared, means for momentarily rendering inoperative the means for advancing the strip when the clamping means clamp the strip, whereby at the time of shearing the advance of the strip is controlled by the shear, and means for operating the clamping means including an elongated member advanceable in timed relation with the advance of the shear and having a cam element effective to render the clamping means operative just prior to the instant of shearing, the cam element becoming inoperative and hence releasing the clamping means upon continued advance of the elongated member.

30. Apparatus for shearing continuously advancing strip comprising a cylically operable shear which advances while it shears, the shear including continuously cyclically operating shearing means, means for advancing strip relatively to the shear, clamping means advanceable with the shear clamping a portion of the strip while the strip is being sheared, means for momentarily rendering inoperative the means for advancing the strip when the clamping means clamp the strip, whereby at the time of shearing the advance of the strip is controlled by the shear, and means for operating the clamping means including a pivoted dog, stop means for limiting turning of the dog about its pivot in one direction and a cam oscillatable in timed relation with the advance of the shear adapted when moving in one direction to engage and bodily displace the dog when against the stop and thereby render the clamping means operative just prior to the instant of shearing, the cam upon its return movement in the opposite direction turning the dog about its pivot and having no effect on the clamping means.

References Cited in the file of this patent

UNITED STATES PATENTS

| | | |
|---|---|---|
| 1,118,513 | Sheldon | Nov. 24, 1914 |
| 1,982,880 | Pachter | Dec. 4, 1934 |
| 1,993,967 | Koelliker | Mar. 12, 1935 |
| 2,071,402 | Hazelton | Feb. 23, 1937 |
| 2,310,182 | Munschauer | Feb. 2, 1943 |
| 2,815,074 | Dehn | Dec. 3, 1957 |
| 2,874,775 | Muller | Feb. 24, 1959 |
| 2,250,931 | Greider | July 29, 1960 |

UNITED STATES PATENT OFFICE
CERTIFICATE OF CORRECTION

Patent No. 3,045,519                                              July 24, 1962

Albert J. Sarka

It is hereby certified that error appears in the above numbered patent requiring correction and that the said Letters Patent should read as corrected below.

Column 14, lines 12 and 13, for "stop-connected" read -- stop connected --; column 16, line 40, for "July 29, 1960" read -- July 29, 1941 --.

Signed and sealed this 11th day of December 1962.

(SEAL)
Attest:

ERNEST W. SWIDER                                            DAVID L. LADD
Attesting Officer                                              Commissioner of Patents